United States Patent [19]

Roman

[11] 4,181,447
[45] Jan. 1, 1980

[54] JOINT FOR TUBULAR STRUCTURAL ELEMENTS PARTICULARLY FOR THE JOINTING OF THE STRUCTURAL ELEMENTS OF HOSE CARRIAGES

[75] Inventor: Gian F. Roman, Pasiano, Italy

[73] Assignee: Claber S.p.A., Fiume Veneto, Italy

[21] Appl. No.: 928,617

[22] Filed: Jul. 27, 1978

[30] Foreign Application Priority Data

Aug. 10, 1977 [IT] Italy .............................. 22033/77[U]

[51] Int. Cl.² .......................... F16B 1/00; F16L 41/00
[52] U.S. Cl. ........................................ 403/4; 403/188; 403/312
[58] Field of Search .................. 403/4, 218, 188, 310, 403/311, 312, 340, 344, 391, 407, 408; 16/111 A

[56] References Cited

U.S. PATENT DOCUMENTS

| | | | |
|---|---|---|---|
| 1,801,235 | 4/1931 | Hill | 403/312 |
| 2,651,075 | 9/1953 | O'Maley | 16/111 A |
| 3,204,481 | 9/1965 | Golden | 403/340 X |
| 3,500,976 | 3/1970 | Halley | 403/4 X |
| 3,515,398 | 6/1970 | Thompson | 403/4 X |
| 3,604,687 | 9/1971 | Moore | 403/391 X |
| 3,916,472 | 11/1975 | Carder | 403/4 X |
| 4,067,655 | 1/1978 | Mayerhofer | 403/4 |

FOREIGN PATENT DOCUMENTS

| | | | |
|---|---|---|---|
| 229119 | 12/1958 | Australia | 16/111 A |
| 2245143 | 3/1924 | Fed. Rep. of Germany | 403/310 |

Primary Examiner—Wayne L. Shedd
Attorney, Agent, or Firm—Cushman, Darby & Cushman

[57] ABSTRACT

A joint for tubular structural elements, particularly for the jointing of the structural elements of hose carriages, is disclosed, in which two identical prismatic bodies are matchable with each other in two upturned mutual positions. Each body having a blind-hole seat for receiving the end of one tubular element and a central through-half-seat at the matching surface for receiving a half of another tubular element. The axes of the blind-hole seat and of the half-seat of each body form orthogonal skew lines. Fixing means for clamping the two matching bodies traverse the tubular elements inserted in the seats.

3 Claims, 7 Drawing Figures

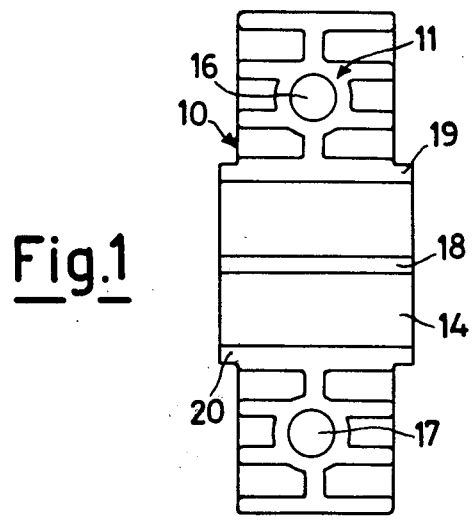
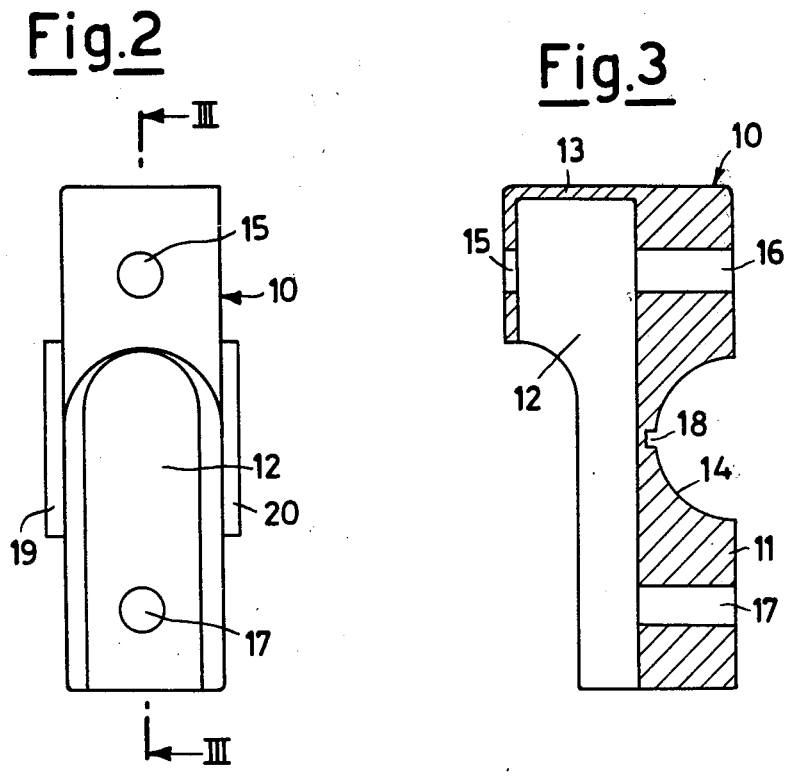

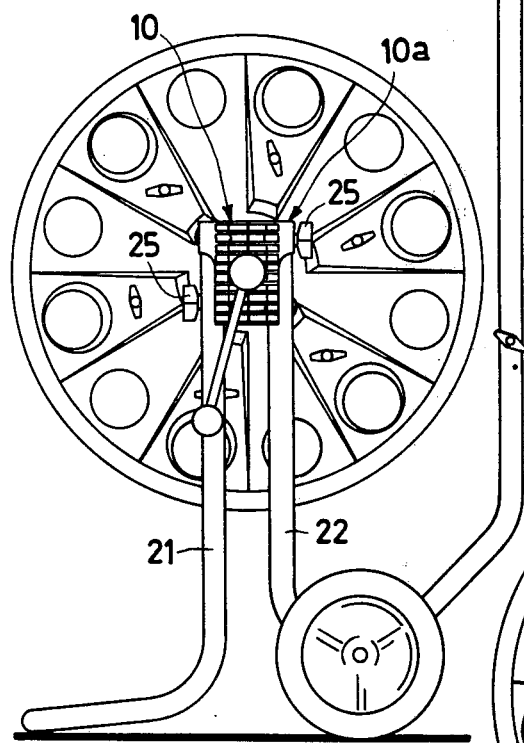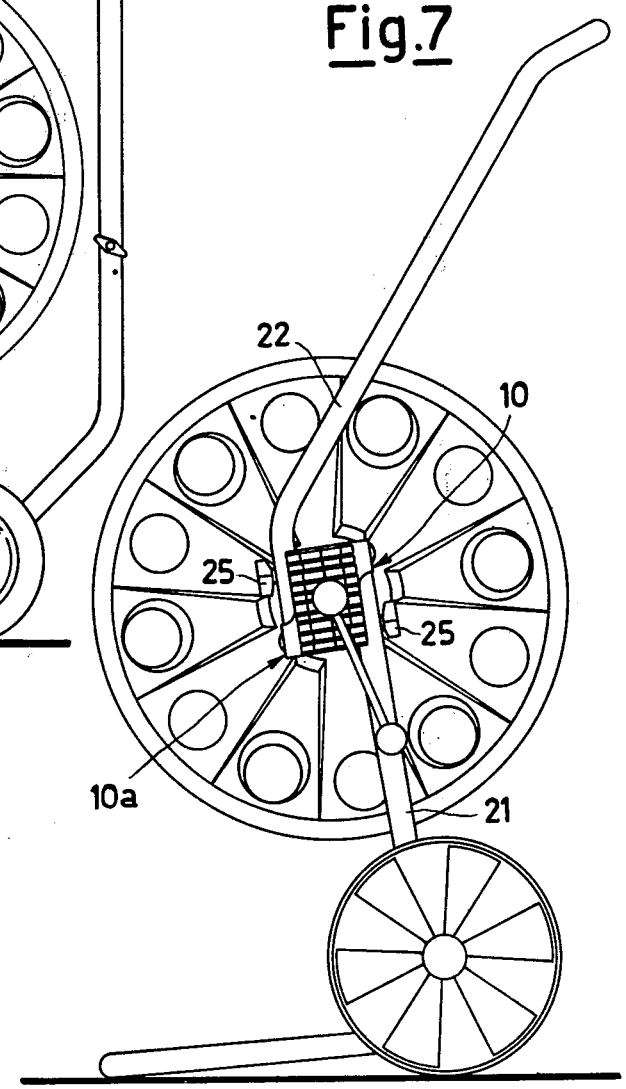

JOINT FOR TUBULAR STRUCTURAL ELEMENTS PARTICULARLY FOR THE JOINTING OF THE STRUCTURAL ELEMENTS OF HOSE CARRIAGES

The present invention concerns a joint for tubular structural elements which can find useful application in the jointing of the structural elements of hose carriages used in gardening for irrigation, watering, etc.

One purpose of the invention is to realize a joint such as allows the rapid assembly of the tubular elements without the need to use weldings or other complicated jointing methods.

Another purpose of the invention is to provide a simple joint such as can be readily formed by the moulding of plastic and requires no special implement or tool in its application for the jointing of tubular elements.

Yet another purpose of the invention is to provide a joint which enables the tubular elements to be jointed in various ways.

In its application for hose carriages for irrigation, the joint according to the present invention provides for the joining of two tubular elements of the structure of the carriage whose axes are parallel, and at the same time acts as support for the hub of the wind-up drum on which the hose or rubber hosing is wound, where the axis of the hub is perpendicular to the plane containing the axes of the two tubular elements.

Naturally, in other applications of the joint according to the invention, it is possible to provide for the joining of three tubular elements, where the third of these can take the place of the aforesaid hub.

The purposes briefly mentioned above are achieved according to the invention by means of a joint consisting of two substantially prismatic bodies, identical and joinable, in two inverted mutual positions, along one of their external surfaces, each body being provided with a blind hole for receiving the extremity of a tubular element and with a central through-half-seat in the joining surface, for receiving half of another tubular element, the other half of the last-mentioned element being destined to be received by the corresponding half-seat of the second body, the axes of the said blind hole seat and of said half-seat of each body forming orthogonal skew lines, means being provided for clamping between them the two matched bodies and said means being destined to traverse the tubular elements inserted in said seats of each body.

In one form of execution of the joint, each body can have a part removed in the side opposite that of matching with the other body, so as to make the blind-hole seating partially open.

The means for clamping the two bodies of the joint and of the tubular elements inserted in their blind-hole seatings can with advantage be screws and wing-nuts, the screws being passed through appropriate holes provided in the bodies and tubular elements, provision being made for two screws, equidistant from the central half-seats and with their axes parallel and intersecting the axes of the blind-hole seats at right angles.

When the two bodies of the joint are so matched that the blind-holes of their seatings are on the same side, the two jointed tubular elements come out from the same side of the joint, and that is to say from the side opposite the bottoms of said seat blind-holes. When, on the contrary, the two bodies are matched in an upturned position, one element emerges from one side of the joint and the other element from the opposite side.

As the holes for the clamping screws are disposed symmetrically with respect to the median plane passing through the axis of the half-seats, the holes of one body are always aligned with the holes of the other body, whatever the mutual match position of the two bodies of the joint.

Further characteristics and advantages of the joint according to the invention will become clearer through the following detailed description of one form of execution and of some applications of the said joint, such description being made with reference to the attached drawings, in which:

FIG. 1 is a view from the matching side of one of the bodies forming the joint,

FIG. 2 is a view of said body from the opposite side,

FIG. 3 is a section according to the line III—III of FIG. 2,

Figure 4:
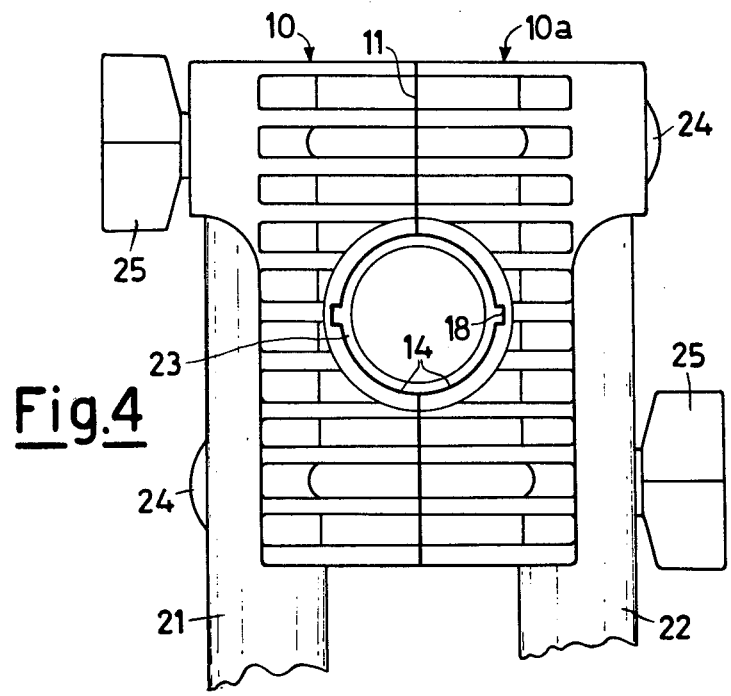
Figure 5:
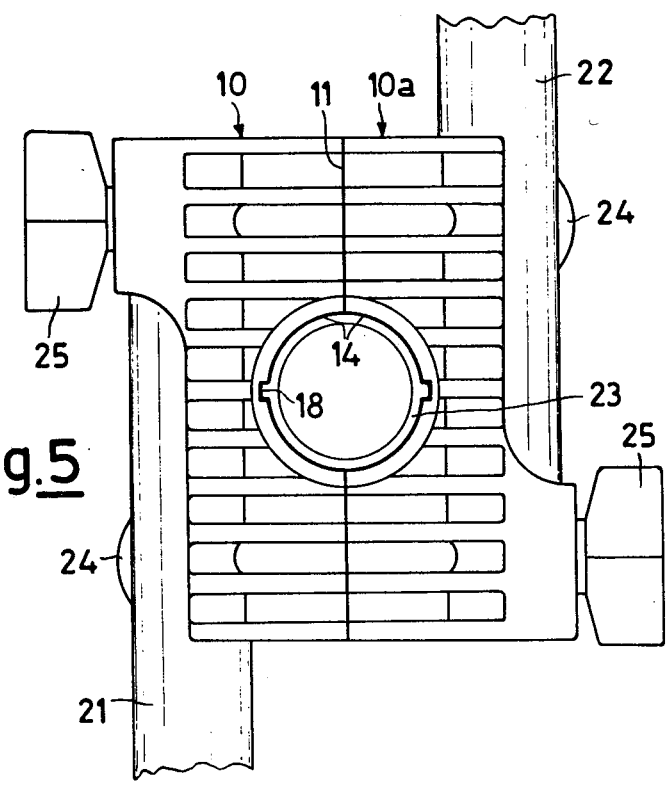

FIGS. 4 and 5 show the joint in frontal view in the two possible positions of mutual match of the two component bodies, and FIGS. 6 and 7 show the joint applied to two types of hose carriage, in, respectively, the methods of matching the two component bodies illustrated in the FIGS. 4 and 5.

The joint according to the invention is composed of two variously matchable identical bodies.

With reference to FIGS. from 1 to 3, description will in the first place be made of one of these bodies, indicated generically with 10.

The body 10 has a substantially prismatic form with one lateral surface 11 of matching to a second, identical body, as will result hereinafter. In the body 10 there is formed, shifted from the median line on the opposite side with respect to the matching surface 11, a longitudinal seat 12 with closed bottom 13 and, as on the side opposite the matching side the body 10 has a part removed, the said seat 12 proves partially open on the said opposite side.

On the matching surface 11 there is also provision for a central half-seat 14 whose axis forms, with the axis of the seat 12, two orthogonal skew lines.

The body 10 is traversed by some holes for the passage of clamping screws. In particular, as can particularly be seen in FIG. 3, on one side of the central half-seat 14 provision is made for two aligned holes 15, 16, the axis of which intersects at right angles the axis of the seat 12 and is at a determined distance from the median plane passing through the axis of the axis of the semi-seat 14. At the same distance from said plane, but on the other side of the half-seat 14, provision is made for another hole 17 whose axis is parallel to the axis of the holes 15, 16, and which also intersects the axis of the seat 12.

The half-seat 14 is provided with a longitudinal grooving 18 adapted to receive a latch, and at the two sides of this through-half-seat the body 10 has annular protruberances 19, 20.

With reference to FIGS. 4 and 5, it is seen how the joint is composed from two identical bodies, as illustrated in FIGS. 1–3, indicated with 10 and 10a.

In the disposition according to FIG. 4, the two bodies 10 and 10a are matched along their surfaces 11 in such a way that the closed bottoms 13 of their seats 12 are on the same side (upwards in the Figure). Therefore the two tubular elements 21, 22 to be jointed, inserted respectively in the seats 12 of the two bodies, come out from the joint on the same side (at bottom in the Figure). The third tubular element 23 inserted in the half-seats 14 of the two bodies 10, 10a of the joint, traverses the said joint centrally and its axis is orthogonal to the plane containing the parallel axes of the elements 21, 22. The two bodies 10, 10a are clamped together by two screws, one of which traverses the holes 15, 16 of the two bodies and corresponding holes of the elements 21, 22, while the other traverses the holes 17 of the two bodies and corresponding holes of the elements 21, 22. At one end, the screws have heads 24 which rest against the external walls of the bodies, while on the other end are screwed wing-nuts 25 to tighten together the bodies 10, 10a and lock the tubular elements 21, 22 and 23.

The screws can feature square section portions inserted in corresponding square holes of the tubular elements 21, 22, in order to prevent their rotation at the time of the tightening of the wing-nuts 25.

In the FIG. 5, the two bodies 10, 10a of the joint are illustrated matched in a position with one body upturned with respect to the other, so that the tube 21 comes out from the joint in a downwards direction (as seen in the Figure), while the other tubular element 22 comes out upwards.

Also in this upturned disposition of the two bodies 10, 10a, the clamping means can be caused to pass through the holes provided in the bodies of the joint, the holes 15, 16 of one body now being aligned with the hole 17 of the other body.

The FIGS. 6 and 7 illustrate, finally, the application of the joints according to FIGS. 4 and 5 respectively in two types of hose carriage for garden irrigation.

As is seen, the type of carriage illustrated in FIG. 6 provides for a structure with tubular elements which from the hub of the drum on which the hose is wound proceed parallely for a certain section in the same direction: the joint according to the invention is applied in the disposition according to FIG. 4.

The other type of carriage according to FIG. 7 provides for a structure with tubular elements which from the hub of the drum go in opposite directions: in this case the joint according to the invention in the disposition according to FIG. 5 is employed.

It is clear that the joint according to the invention can find numerous other applications besides those exemplified.

It is particularly distinguished by reason of its constructive simplicity, its easy and practical use resulting from the speed with which the assembly can be made without any welding, without complex organs and without the need to use special implements or tools.

The versatility of the joint is, furthermore, considerable, and this allows its use in various manners of matching.

I claim:

1. A joint for tubular structural elements, particularly for hose carriages, comprising a pair of identical bodies each having a side which matches a corresponding side on the other body, said bodies being arranged with said sides facing each other, said bodies being clamped to one another by releasable clamping means passing through said bodies perpendicularly to the matching sides thereof, each body including a blind-hole seat extending parallel to the respective matching side for receiving a respective tubular element and a central recessed portion in the respective matching side which cooperates with the corresponding recessed portion of the matching side of the other body to define a pass-through seat extending perpendicularly to said blind-hole seats for receiving a further tubular element.

2. A joint according to claim 1, wherein at a side opposite to said matching side each body is cut away so that the respective blind-hole seat is partially open.

3. A joint according to claim 1, wherein said clamping means includes screws and wing-nuts, said screws being inserted in aligned pairs of holes which are symmetrically disposed with respect to said recessed portions and pass through said blind-hole seats.

* * * * *